March 16, 1948.     C. E. MAYNARD     2,437,884
METHOD FOR MAKING PLASTIC COMB HOLDERS
Filed Sept. 18, 1947
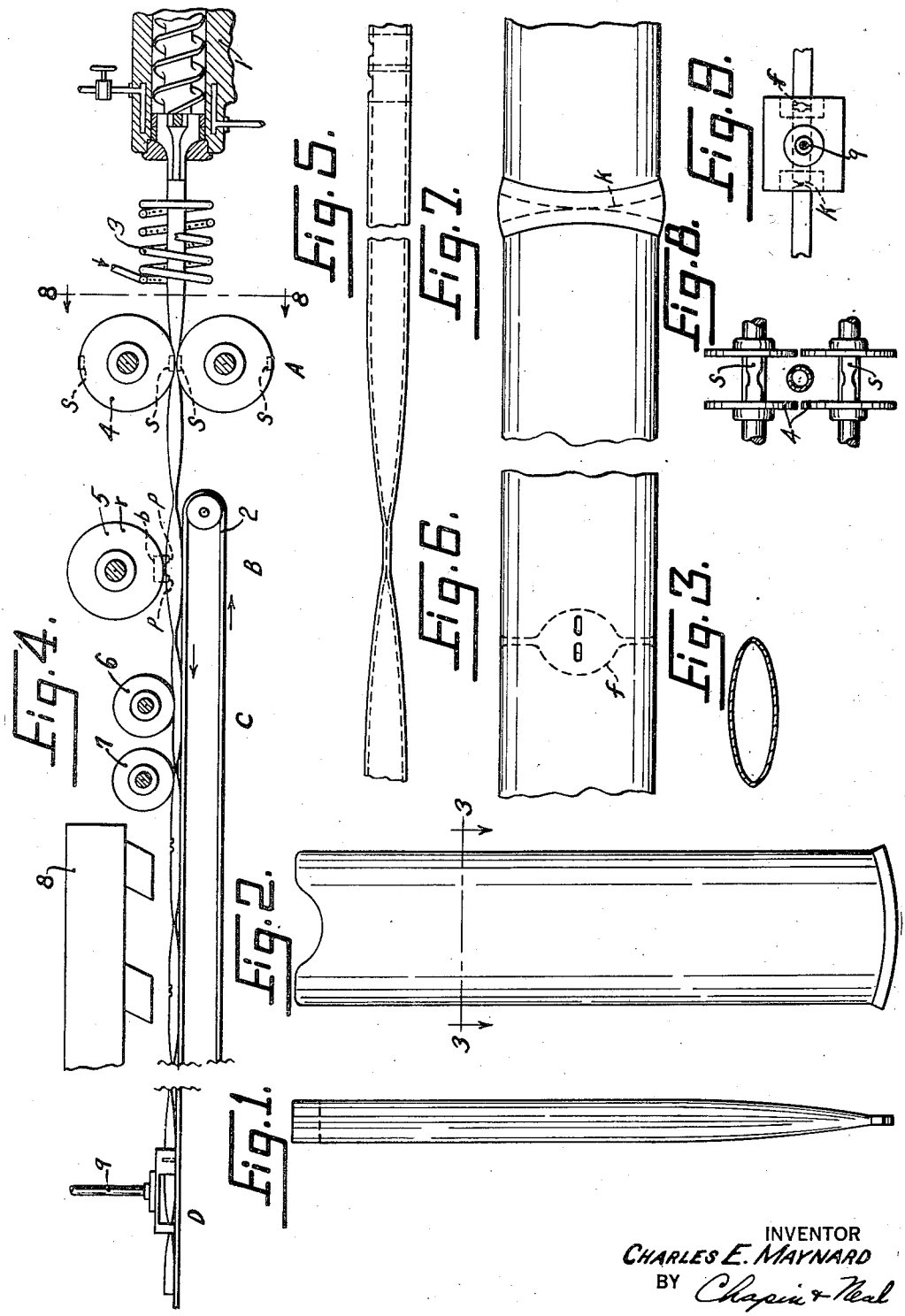
INVENTOR
CHARLES E. MAYNARD
BY Chapin & Neal
ATTORNEYS Patented Mar. 16, 1948

2,437,884

UNITED STATES PATENT OFFICE 2,437,884

METHOD FOR MAKING PLASTIC COMB HOLDERS

Charles Edgar Maynard, Florence, Mass., assignor to The Pro-Phy-Lac-Tic Company, Florence, Mass., a corporation of Massachusetts Application September 18, 1947, Serial No. 774,709

4 Claims. (Cl. 18—47.5)

This invention consists in a method for making comb holders of thermoplastic material. In its broader aspects it is related to the method invention disclosed in my copending application Serial No. 702,118, filed October 9, 1946. Several specific features of the present disclosure are new and particularly useful because they result in making a much better product than the method of said previous application. The new method will be described with the accompanying drawings keeping in mind that the object is to make high quality comb holders at low cost.

In the drawings,

Figs. 1 and 2 show the comb holder of a pocket size full scale in side face and in front (or rear) plan views respectively;

Fig. 3 is a section on line 3—3 of Fig. 2;

Fig. 4 is a diagrammatic view of apparatus used in the commercial practice of the method;

Figs. 5, 6, and 7 are detail views indicating stages of the product in the course of its manufacture;

Fig. 8 is a sectional elevation of a sealing device and a section of the tubed material taken on line 8—8 of Fig. 4 after the sealing device has travelled through 90 degrees; and Fig. 9 is a plan view of the cutting operation shown in Fig. 4, at work station D.

The form of the comb holder made by the method is shown by Figs. 1, 2, and 3. It is made of thermoplastic material such as poly-ethy-lene, called in the trade poly thene, for example. This is one of a class of thermoplastic materials obtainable at low cost and with desirable characteristics adapted to be worked by the method and make a high quality product.

It is desirable to make many comb holders having substantially the same dimensions and each of symmetrical form. The routine way to do this would be by molding them or cutting parts and fastening them together which would increase the cost of making far beyond that of my method.

According to my method the product of Figs. 1, 2 and 3 may be made by the apparatus indicated in Fig. 4 used as a combination of tools to practice the method.

The heat plasticized material is extruded from machine 1 into coreless tube form of round section. A conventional plastic tubing machine may be used for this step. The tube of hot material begins to cool as it leaves machine 1. Because the material is in hot plasticized condition there is a tendency for it to flatten out. This tendency is counteracted and made to act very slowly by enough wall thickness, see Fig. 3; by suspending the tube in its run from machine 1, for a substantial distance before it reaches conveyor 2; and by artificial cooling means indicated at 3.

These features of the method, acting between machine 1 and conveyor 2, are important. As the tube emerges from the tubing die of machine 1 it runs in suspended form to conveyor 2. In the distance of this suspended run the tube is substantially cooled on its outside surface. It is cooled enough to retain the sheen of its surface before such sheen can be marred by contact with any supporting surface, conveyor 2, for example. In some instances it is desirable to have the extruding die provided with small teeth to make narrow longitudinal decorative grooves on the surface of the tube. These grooves and the sheen given to the material in the hot extrusion from machine 1 are both important to retain unblemished in the finished article. To chill the tubed material fast enough on its surface to prevent marring the surface when it reaches the conveyor, the artificial cooling device 3 is used, preferably at the location indicated. Artificial cooling device 3, as shown, consists of a spiraled series of hollow coils completely encircling the hot extruded tube in spaced relation and the coils have numerous jet openings equally spaced around the inside periphery of each coil to eject compressed air on the tube and help hold it in a suspended state while cooling.

When the exterior of the tubed material has been cooled enough not to be marred by quick contact and the interior is still warm enough for the tube to be heat sealed by welding the interior surface together with pressure, sealing device 4 completely flattens and heat seals the tube at spaced portions or intervals of length. Contact of squeeze plates s (see Fig. 8) on motor driven sealing device 4 (motor and drive not shown) with the tubed material occurs only at intervals and is of such a short duration that the tubed material suspended through the sealing device gets no material support from the sealing device.

It is to be noted that the sealing operation takes place when the material is suspended between extruding machine 1 and conveyor 2, and not when the material is resting on conveyor 2. This positioning of the sealer provides a symmetry in the tapered portions of the tubed material formed adjacent to the seal and avoids a warped or buckled form (see Fig. 5). As shown in Figs. 4 and 8, the sealer is constructed so that equal pressure by sealing plates s on opposite sides of the tubed material squeeze the tube together without distorting the identically tapered portions of tubing formed adjacent the squeezed portions.

The tubed material, flattened only at the heat sealed portions and mostly still in tubular form, is carried in suspended condition until its exterior surface cools to the degree where prolonged contact and work operations will not mar it, whereupon the partially cooled material runs onto traveling conveyor 2. The speed of this conveyor is synchronized with the speed of the extruding machine so that the tubed material coming from the sealing device 4 is carried at a uniform rate to successive work stations.

At work station B, a pricking or puncturing device 5, composed of roller r having a unit b with two projections or prongs p, punctures each hollow section of tubing coming from the sealer midway between its sealed ends to permit the escape of trapped air and to allow for partial collapse of the tube from the form in which it has been suspended for cooling.

The partial collapse of each sealed length so punctured is positively regulated and controlled in a predetermined manner by rolling the part intermediate the tapered end portions to a predetermined and uniform cross section under pressure rolls 6 and 7 at work station C.

Pressure rolls 6 and 7 bear on the tube material with sufficient pressure to partially flatten the tube, but have their axes fixed so as to allow for no more than the predetermined degree of flattening. Flanges on the rolls (not shown) rest on the conveyor and confine flattening of the tube material to the raised center portion.

When the material leaves pressure roll 7, it has hardened sufficiently to be "set," i. e., in form retaining condition, so there is no further flattening of the material under its own weight.

Cooling blowers 8 are spaced at regular intervals along the conveyor belt 2 past work station C. This auxiliary cooling means is provided only in order to shorten the length of the conveyor and still give sufficient cooling time to harden the form before it is cut into comb holders (Fig. 9) and the holders dropped into a storage box. Cut off device 9, which may be either an automatic cut off device or a hand operated cut off, placed at work station D at the end of the belt, simultaneously makes cuts of the configuration k (Figs. 7 and 9) to form the rounded closed ends of two comb holders and cuts of the configuration f (Figs. 6 and 9) to form the finger notched open ends of two comb holders. The finished product has the form shown by Figs. 1, 2, and 3.

Various colors of plastic may be used to advantage in producing harmonizing matched sets of comb and comb holder. The finished product is of better appearance with better wearing properties than the finest leather holders, and can be sold at a much lower price.

Having disclosed the method, the claims of the method are:

1. The method of making pocket comb holders of thermoplastic material by the use of a tubing machine and its delivery conveyor which consists in tubing the hot material without a core and with a wall thickness to permit slow collapse of the tube form, running the tube, as it is formed, in suspended condition through a working space before it reaches the conveyor, directing cooling jets of air against the outer surface of the tube form all around its circumference to chill its surface to prevent marring when it reaches the conveyor and to help support the tube form until it reaches the conveyor, before it reaches the conveyor squeezing the tube together by identical mechanical action on opposite sides of the tube to heat seal such tube over short portions spaced about double the length of the comb holders wanted, pricking the tube to vent it midway between such portions, carrying the tube form on the conveyor, for partial flattening those portions between the heat sealed portions to neatly receive the form of a comb, cooling the tube to set the material in substantially comb receiving form, and then cutting off the lengths of comb holders midway between such heat sealed portions of the tube and also across such heat sealed portions to form one closed and one open end for each of the cut off comb holders.

2. The method of making pocket comb holders by the use of a tubing machine and its delivery conveyor which method consists in running a continuous length of hot thermoplastic tubing of round cross section without a core and in condition to slowly collapse while the material is hot, running such tubing in suspended condition between the tubing machine and its conveyor without any mechanical support against its surface, blowing cooling jets against its outside surface all around the tubing to rapidly chill the surface and help support the tubing in its suspended condition, heat sealing the tubing at short spaced portions of its length and while in its suspended run by squeezing the opposite walls together and thereby forming tapered portions of the tubing adjacent said squeezed portions, the separation of said spaced portions being of a length about double the length of the comb holders wanted so such length will consist of oppositely disposed tapered portions and an intermediate untapered portion, venting said spaced portions midway of their length by pricking the tubing, rolling down the untapered portions when they reach the conveyor to give them the predetermined cross section to neatly encase a comb, artificially chilling the tubing enough to substantially set it while on the conveyor and after such portions are then set cutting off comb lengths by cuts across the heat sealed portions and also cutting across midway of the rolled down portion.

3. The method of making a plastic comb holder, consisting of extruding, continuously, hot thermoplastic material in hollow tube form without an internal solid or liquid supporting element and with walls of a thickness to allow only gradual and progressive collapse while the tube is hot; cooling the tubed material immediately on extruding by artificial means while said material is suspended between extruder and conveyor to the degree that quick contact will not mar the exterior surface sheen; heat-sealing the tubed material at spaced intervals with a pressure sealing device by utilizing the internal heat of said material; cooling further the suspended tubed material by atmospheric means until prolonged contact will not mar the surface; running the suspended material at this temperature stage onto a traveling conveyor belt; puncturing the walls of the tubed material at predetermined and uniform points by a pricking device to vent the interior of the tube to the atmosphere and release the pressure between the sealed portions; rolling the partially deflated tubed material to a predetermined thickness at a time when said material will leave the rollers in form retaining condition; accelerating the hardening of the form by allowing it to pass under blowers placed over the conveyor belt; and cutting two comb holders from each sealed portion of partially flattened tubed material when said material has sufficiently hardened to do so.

4. The method of making carrying cases for pocket combs from thermoplastic material, consisting of extruding hot thermoplastic material in continuous tubed form with a hollow, coreless interior portion and walls of a thickness predetermined to allow for a gauged partial collapse by internal heat loss and external pressure before their "setting" or form retaining temperature has been reached; suspending the tubed material from the extruder to a traveling conveyor belt over a predetermined distance; cooling the tubed material to the degree where quick contact will not mar the exterior surface by artificial cooling means that encircle and lend partial support to the suspended material; heat sealing the tubed material at spaced intervals of length by pressure and internal tube heat with a sealing device while the tubed material is suspended so as to obtain a symmetrical taper in the sealed form adjacent its sealed portion, said sealing device contacting tubed material only at intervals and lending no material support to the suspended material during the sealing operation; allowing the material to cool sufficiently after it passes through the sealer so that prolonged contact will not mar the surface; running suspended material cooled to said sufficiency onto a traveling conveyor belt to carry it to successive work stations, puncturing the walls of the sealed hollow tube lengths at a point intermediate the sealed portions to vent said tube to the atmosphere; flattening the partially collapsed form to a predetermined degree by pressure rolls at a time when the temperature of the material as it leaves the last pressure roll will be that required to "set" the thermoplastic material in form retaining condition; accelerating the hardening of the form by artificial cooling means and cutting cases from the hardened form by a cutting device with cuts so spaced and of such a character as to give two cases from each sealed portion of material each case having a rounded closed end and an open finger-notched end respectively.

CHARLES EDGAR MAYNARD.